(12) United States Patent
Haug

(10) Patent No.: US 10,915,237 B2
(45) Date of Patent: Feb. 9, 2021

(54) TESTING OF VIRTUAL USER INTERFACES

(71) Applicant: Thomas Haug, Birkenfeld (DE)

(72) Inventor: Thomas Haug, Birkenfeld (DE)

( * ) Notice: Subject to any disclaimer, the term of this patent is extended or adjusted under 35 U.S.C. 154(b) by 67 days.

(21) Appl. No.: 16/304,930

(22) PCT Filed: Apr. 25, 2017

(86) PCT No.: PCT/EP2017/059737
§ 371 (c)(1),
(2) Date: Nov. 27, 2018

(87) PCT Pub. No.: WO2017/207171
PCT Pub. Date: Dec. 7, 2017

(65) Prior Publication Data
US 2019/0265877 A1   Aug. 29, 2019

(30) Foreign Application Priority Data

Jun. 3, 2016  (DE) .......................... 10 2016 110 321

(51) Int. Cl.
| | |
|---|---|
| *G06F 3/0484* | (2013.01) |
| *G06F 3/0481* | (2013.01) |
| *G06F 3/0488* | (2013.01) |
| *G06F 3/048* | (2013.01) |

(Continued)

(52) U.S. Cl.
CPC .......... *G06F 3/04847* (2013.01); *G06F 3/048* (2013.01); *G06F 3/0488* (2013.01);
(Continued)

(58) Field of Classification Search
CPC .. G06F 3/04847; G06F 3/048; G06F 3/04817; G06F 3/0488; G06F 30/00;
(Continued)

(56) References Cited

U.S. PATENT DOCUMENTS

| | | |
|---|---|---|
| 5,291,587 A | 3/1994 | Kodosky et al. |
| 2003/0220911 A1* | 11/2003 | Tompras ................. G06F 30/00 |

(Continued)

OTHER PUBLICATIONS

Apple, "A Quick Tour of Xcode", Aug. 28, 2003, XP055387405, Retrieved from the Internet: <URL:https://www.ibr.cs.tu-bs.de/courses/ws0708/pcn/Doku/XcodeQuickTour.pdf>, pp. 1-50.

(Continued)

*Primary Examiner* — Ajay M Bhatia
*Assistant Examiner* — Mong-Shune Chung
(74) *Attorney, Agent, or Firm* — Birch, Stewart, Kolasch & Birch, LLP

(57) ABSTRACT

A computer programme product (10) for the configuration of a user-specific product (12) is stored on a mobile computer (2) and has a virtual library (14) with a plurality of selectable virtual components (16) for the compilation of a virtual model (12M) of the product (12) which can be shown on a display (4) of the mobile computer (2), wherein product information (I) for the creation of the actual user-specific product (12) is derivable on the basis of the components (16) selected for the displayed virtual model (12M). According to the invention, at least one functional device (36) is provided on the mobile computer (2), the device being controllable by means of touch operation of the virtual model (12M) on the display (4).

15 Claims, 2 Drawing Sheets

Figure 1:
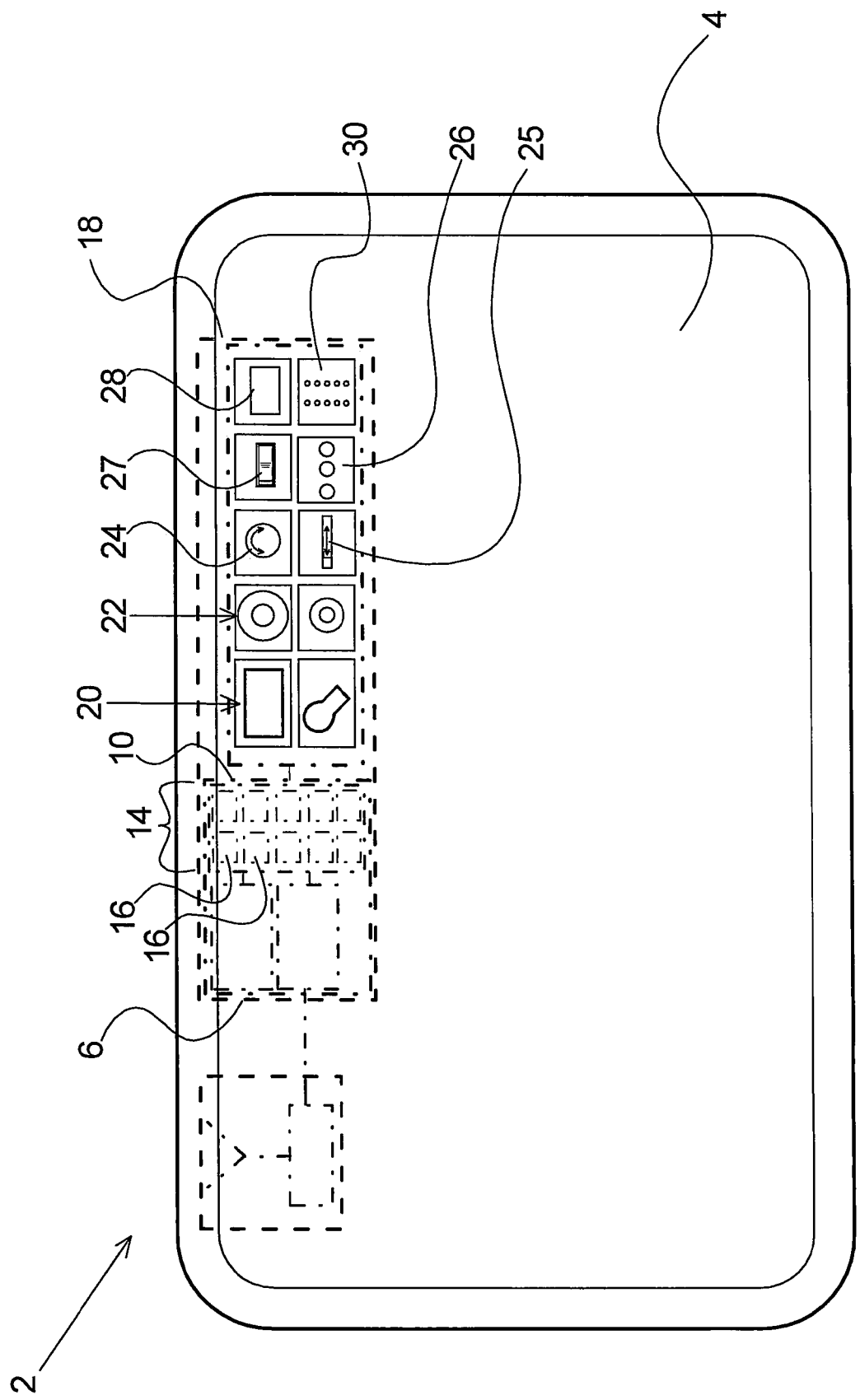

(51) Int. Cl.
　　*H04W 4/80* (2018.01)
　　*G06F 30/00* (2020.01)
　　*G06F 111/20* (2020.01)

(52) U.S. Cl.
　　CPC .......... *G06F 3/04817* (2013.01); *G06F 30/00* (2020.01); *G06F 2111/20* (2020.01); *H04W 4/80* (2018.02)

(58) Field of Classification Search
　　CPC ...... G06F 2111/20; G06F 30/10; G06F 30/12; G06F 30/20; H04W 4/80
　　See application file for complete search history.

(56) References Cited

U.S. PATENT DOCUMENTS

| | | | | |
|---|---|---|---|---|
| 2008/0255818 | A1* | 10/2008 | Jefferson | G06F 30/00 703/13 |
| 2013/0013268 | A1* | 1/2013 | Woolf | G06F 17/00 703/1 |
| 2014/0122028 | A1* | 5/2014 | Aberg | G06F 11/3684 703/1 |
| 2017/0206285 | A1* | 7/2017 | Grossman | G06F 30/00 |

OTHER PUBLICATIONS

Bacic, M., "On hardware-in-the-loop simulation", Proceedings of the 44th IEEE Conference on Decision and Control, and the European Control Conference 2005, Seville, Spain, Dec. 12-15, 2005, pp. 3194-3198.

International Search Report (PCT/ISA/210) issued in PCT/EP2017/059737, dated Jul. 12, 2017.

Jo et al., "Design Evaluation System with Visualization and Interaction of Mobile Devices Based on Virtual Reality Prototypes", ETRI Journal, vol. 30, No. 6, Dec. 2008, pp. 757-764.

* cited by examiner

TESTING OF VIRTUAL USER INTERFACES

The invention concerns a computer programme product for the configuration of a user-specific product, such as in particular a remote-control device for lifting and/or transport devices, according to the preamble of claim 1. The computer programme product is to this end saved on a mobile computer and has a virtual library with several selectable virtual components. The virtual components here serve to compile a virtual model of the product which can be displayed on a display of the mobile computer. In this regard, on the basis of the displayed virtual model or on the basis of the components selected for it, items of product information are generated which can be used for the production of the real user-specific product.

Computer programme products of this type for the configuration of individualised products are used nowadays in many technical areas. In this respect the computer programme products enable for the interested parties a user-specific compilation and visualisation of the respective product, while the provider receives, from the information given by the interested parties, simultaneously all data which facilitate the production of the user-specific product.

The article by JO, Domg-Sik; YANG, Ungyeon; SON, Wook-Ho: "Design evaluation System with visualization and interaction of mobile devices based on virtual reality prototypes." ETRI journal, 2008, 30th Year, No. 6, pages 757-764 describes a computer application for the generation of a virtual telephone model which is displayed on a computer display. The keys of the telephone model can here be controlled in order to generate signals which for example generate a display on the display of the telephone. For controlling the keys, here serves either a cursor or a virtual hand displayed on the computer display.

The article from BACIC, Marko: "On hardware-in-the-loop simulation." Proceedings of the $44^{th}$ IEEE Conference on Decision and Control. IEEE, 2005. Pages 3194-3198 describes different "hardware-in-the-loop" assemblies, in the case of which real automobile parts are connected with virtual components in order to be able to carry out specific simulations.

A basic disadvantage of configurations of this sort or of individualised products per se, however, is that these are available for the interested party only after a specific production time. Depending on the type of the product to be manufactured, this period of time can extend over several weeks or months. In addition, the interested party has the opportunity of using the respective product in practice only after its production. In many cases, it is only in the course of these practical applications that certain shortcomings of the respective configuration can be determined, which, however, by reason of the product manufacture being already finished, can no longer be corrected, or only with very great trouble.

The task of the invention is to facilitate a configuration of user-specific products which avoids these disadvantages.

This task is carried out by means of a computer programme product with the characteristics of claim 1. To this end, on the mobile computer is provided at least one functional device, which can be controlled or operated by means of touch operation of the virtual model on the touch sensitive display. As a result of this it is possible to control at least one function of the computer with reference to the virtual model which has been individually compiled and displayed on the touch sensitive display of the computer. In this manner, the virtual model displayed on the computer is already at least to a limited extent functional and can thus be practically tested by the interested party even before the production of the real product. Thereby, the mobile computer forms, with the virtual model which is displayed on its touch sensitive display and is controllable, a replacement device such as in particular a remote-control device, which can be physically carried and haptically tested. For example, in the case of an individually compiled remote-control device, in this manner, the desired arrangement of different functional elements can be tested on the virtual model with regard to their practicability even before the device is produced. In the case that certain shortcomings are determined in the course of this, appropriate changes can still be made prior to the actual production of the product.

In an especially advantageous embodiment, the at least one functional device is formed by remote-control means. As a result it is possible to use a virtual remote-control device which has been individually configured and is visualised on the display for the remote-controlling of a real receiving device, such as for example in the form of a lifting or transport device.

In this regard it is advantageous when the remote-control means are designed to send radio, Wi-Fi, infrared and/or Bluetooth signals in order, according to usage case, to facilitate a suitable signal transmission to control the remote-controlled device concerned.

Advantageously, the remote-control means have a transceiver in order to facilitate both the sending and also the reception of signals.

In addition it is advantageous when the selectable components have at least one virtual joystick. Thus it is possible in the configuration of the user-specific remote-control device to select at least one joystick with respect to its type and its positioning. In this regard, the construction and positioning of the selected joystick can be tested even prior to the production of the real remote-control device using the displayed virtual model, for example with respect to its handleability.

Advantageously, the selectable components have at least one virtual pushbutton or one virtual key and/or a toggle switch. Thus it is possible, using the virtual model displayed on the computer, that to test user-specific remote-control device even prior to its production, for example with respect to the accessibility of these elements.

Furthermore it is advantageous when the selectable components have at least one virtual rotary knob or slider. In this manner it is for example possible, using the virtual model displayed on the computer, to test for example the installation space necessary for these elements even prior to production of the real remote-control device.

In a further advantageous embodiment, the selectable components have at least one virtual display at which items of information received by means the mobile computer can be displayed. Thus it is possible, using a virtual model displayed on the computer, to test in particular the visibility of the display provided at the remote-control device to be produced.

In addition it is advantageous when the selectable components have at least 2 different remote-control housings, as a result of which also the outer form of the user-specific remote-control device can be adapted to the selected operating components and tested prior to production.

In an especially advantageous embodiment, the mobile computer is in the form of a tablet-PC or a smart phone. In this manner, the virtual model of the user-specific product displayed on the display of the computer can be especially comfortably handled. In particular in the case of a displayed virtual model of a remote-control device, this can in this regard be used in a manner which is very similar to the use of the real remote-control device to be produced. Thus, even prior to the actual production of the remote-control device, a very realistic use of the same is possible by using its virtual model.

In the figures is shown an exemplary embodiment of the invention.

Figure 2:
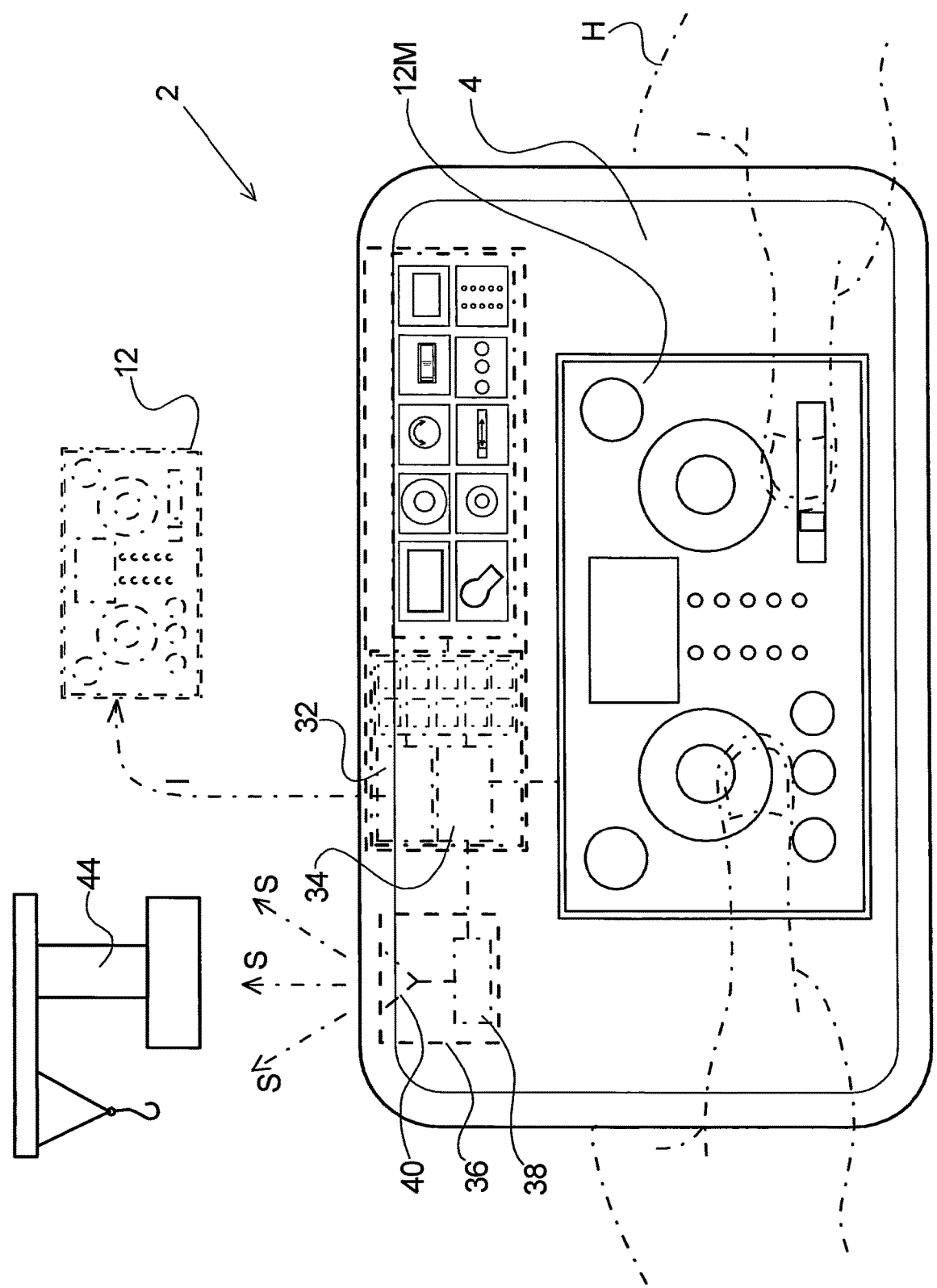

FIG. 1 shows a view of a portable computer with a computer programme product saved thereupon and FIG. 2 shows a view of the computer according to FIG. 1 with a virtual model of a product displayed thereupon.

FIG. 1 shows a portable computer 2 in the form of a tablet computer or of a smart phone having a display 4. The computer 2 has here an electronic system 6 in which a computer programme product 10 is stored.

This computer programme product 10 here serves for the configuration of a user-specific product 12 in the form of a remote-control device which can be produced depending on the items of information inputted by a user. To this end, the computer programme product 10 has a virtual library 14 with several predetermined, selectable virtual components 16 which are displayed in a playback portion 18 of the display 4.

The displayed virtual components 16 here have for example at least two selectable different remote-control housings 20, at least one joystick 22, at least one rotary knob and/or sliding control 24, at least one pushbutton and or toggle switch 26, at least one device display 28 and at least one illuminated display 30.

By clicking on the desired displayed components 16 for example by means of a mouse-controlled cursor or by direct touching of the display area 18, here a virtual model 12M of the desired product 12 can be generated, which is displayed according to FIG. 2 on the display 4. Here, the individual selected operating components can be not only determined but also positioned at the selected remote-control housing 20.

As further shown in FIG. 2, in the computer programme product 10 is additionally provided a first programme part 32 by means of which items of production information can be generated from the components 16 selected by the user. These items of production information can in this regard be read out at the computer 2 or, as shown by arrow I, be forwarded from it and used for the production of the real desired product 12.

A second programme part 34 of the computer programme product 10 serves further to connect the virtual model 12M shown on the display 4 with a functional device 36. The functional device 36 is in this regard in the form of remote-control means with a transceiver 38, in order to be able to send signals S in the form of radio, Wi-Fi, infrared and or Bluetooth signals via an antenna 40 and where necessary to be able to receive further signals.

By means of the programmatic connection of virtual model 12M displayed on the display 4 with the functional device 36, the virtual model 12M can itself be used to generate control signals and to forward them to the transceiver 38 of the functional device 36, from which these then can be transmitted via the antenna 40, in order to control a receiver 44 via the transmitted signals S.

The generation of the control signals occurs in this regard, as shown, by touching the virtual model 12M of the product 12 to be produced, displayed on the display 4, wherein the receiver 44 can be for example in the form of a remote-controlled lifting and/or transport device.

The virtual model 12M displayed at the computer 2 can thus even prior to the production or the completion of the real product 12 in the form of a remote-control device be used in order to control the lifting and or transport device or in order to test in advance, and where necessary to alter, the selected configuration of the product 12.

The invention claimed is:

1. A non-transitory computer readable storage medium having stores thereon a computer programme product which, when executed, configures a user-specific product, comprising:
   a virtual library with several selectable virtual components for the compilation of a virtual model of the user-specific product, which can be displayed on a display of a mobile computer,
   wherein the virtual model is a virtual remote control device corresponding to an actual real remote control for controlling an external device,
   wherein on the basis of the virtual components selected for the displayed virtual remote control device, items of production information can be derived for the production of the actual real remote control device,
   wherein on the mobile computer is provided at least one transceiver which is configured to generate signals corresponding to commands generated by the virtual remote control device to control the external device, and
   wherein the at least one transceiver can be actuated and controlled by operation of the virtual remote control device displayed on the mobile computer.

2. The computer readable storage medium according to claim 1, wherein the at least one transceiver is formed by a remote-control transmitter.

3. The computer readable storage medium according to claim 2, wherein the remote-control is provided for the transmitting of radio, wireless network and/or infrared signals.

4. The computer readable storage medium according to claim 1, wherein the selectable components have at least one virtual joystick configured to receive inputs to generate the commands.

5. The computer readable storage medium according to claim 1, wherein the selectable components have at least one virtual pushbutton or one virtual key and/or a toggle switch configured to receive inputs to generate the commands.

6. The computer readable storage medium according to claim 1, wherein selectable components have at least one virtual rotary knob and or slider configured to receive inputs to generate the commands.

7. The computer readable storage medium according to claim 1, wherein the virtual library further comprises at least one virtual device display at which received items of information are displayable.

8. The computer readable storage medium according to claim 1, wherein the selectable components comprises at least two different remote-control housings.

9. The computer readable storage medium according to claim 1, wherein the mobile computer is in the form of a tablet PC or a smart phone.

10. A terminal, comprising:
   a display;
   a transceiver generating signals to control an external device;
   a virtual library with several selectable virtual components for the compilation of a virtual remote control device which can be displayed on the display, the virtual remote control device corresponding to an actual remote control for controlling the external device; and a processor, the processor configured to:
display the selectable virtual components in a first area of the display,
create the virtual remote control having the virtual components selected by the user, and
cause the transceiver to generate signals corresponding to inputs to the virtual components to control the external device,
wherein the transceiver can be actuated and controlled by operation of the virtual remote control device displayed on the display.

11. The terminal according to claim 10, wherein the signals of the transceiver are radio, wireless network or infrared signals.

12. The terminal according to claim 10, wherein the virtual components include at least one virtual joystick, at least one virtual pushbutton, one virtual key, a virtual toggle switch, a virtual rotary knob or a virtual slider, each configured to receive an input to generate a command corresponding to the signals to control the external device.

13. A method of designing and testing a virtual interface, comprising:
selecting several selectable virtual components from a virtual library to create a virtual remote control device which can be displayed on a display of a computer, the virtual remote control device corresponding to an actual real remote control for controlling an external device,
operating a transceiver to generate signals to control the external device corresponding to commands generated by inputs to the virtual remote control device,
wherein on the basis of the virtual components selected for the displayed virtual remote control device, items of production information can be derived for the production of the actual real remote control device,
wherein the transceiver can be actuated and controlled by operation of the virtual remote control device displayed on the display of the computer.

14. The method according to claim 13, wherein the virtual components include at least one virtual joystick, at least one virtual pushbutton, one virtual key, a virtual toggle switch, a virtual rotary knob or a virtual slider, each configured to receive an input to generate the commands to generate the signals to control the external device.

15. The method according to claim 13, further comprising generating the signals with a remote control transmitter.

* * * * *